United States Patent [19]

Tenberge

[11] Patent Number: 5,277,670
[45] Date of Patent: Jan. 11, 1994

[54] CIRCUIT CHANGE-OVER GEAR WITH INFINITELY VARIABLE TRANSMISSION

[75] Inventor: Peter Tenberge, Fürth, Fed. Rep. of Germany

[73] Assignee: Zahnradfabrik Friedrichshafen, AG., Friedrichshafen, Fed. Rep. of Germany

[21] Appl. No.: 576,471

[22] PCT Filed: Mar. 25, 1989

[86] PCT No.: PCT/EP89/00333
§ 371 Date: Sep. 6, 1990
§ 102(e) Date: Sep. 6, 1990

[87] PCT Pub. No.: WO89/09353
PCT Pub. Date: Oct. 5, 1989

[30] Foreign Application Priority Data

Mar. 30, 1988 [DE] Fed. Rep. of Germany ....... 3810856
Jan. 21, 1989 [DE] Fed. Rep. of Germany ....... 3901754

[51] Int. Cl.$^5$ .......................................... F16H 47/04
[52] U.S. Cl. ....................................... 475/81; 475/79; 475/218; 475/290; 475/296;
[58] Field of Search ....................... 475/72, 79, 80, 81, 475/219, 275, 279, 290, 317, 330, 82, 204, 205, 206, 218, 296

[56] References Cited

U.S. PATENT DOCUMENTS

| 3,446,092 | 5/1969 | Moan | 475/275 |
|---|---|---|---|
| 4,164,155 | 8/1979 | Reed et al. | 475/81 X |
| 4,164,156 | 8/1979 | Reed | 475/81 X |
| 4,232,568 | 11/1980 | Maeda | 475/81 |
| 4,341,131 | 7/1982 | Pollman | 475/81 |
| 4,382,392 | 5/1983 | Meyerle et al. | 475/81 |
| 4,754,664 | 7/1988 | Dick | 475/81 |
| 4,763,543 | 8/1988 | Harada et al. | 475/219 X |
| 5,080,637 | 1/1992 | Tenberge et al. | 475/290 X |
| 5,113,723 | 5/1992 | Ishino et al. | 475/72 X |

FOREIGN PATENT DOCUMENTS

| 3397 | 8/1979 | European Pat. Off. | |
| 3342047 | 6/1985 | Fed. Rep. of Germany. | |
| 3836017 | 4/1990 | Fed. Rep. of Germany | 475/72 |
| 929571 | 7/1947 | France. | |
| 2230183 | 12/1974 | France | 475/72 |
| 53-8464 | 1/1978 | Japan | 475/81 |
| 55-94054 | 7/1980 | Japan | 475/72 |
| 1375241 | 2/1988 | U.S.S.R. | 475/80 |

OTHER PUBLICATIONS

Looman, Johannes, Toothed Gearing, 2d Ed., Springer-Verlag Berlin Heidelberg New York, London, Paris, Tokyo 1988.

*Primary Examiner*—Leslie A. Braun
*Assistant Examiner*—David E. Henn
*Attorney, Agent, or Firm*—Albert M. Zalkind

[57] ABSTRACT

In a load change-over gear with infinitely variable transmission, which includes a linkage gear (1) driven by a main drive shaft (5), a control gear (2) associated with the linkage gear (1), as well as a switching or change-over gear (4) series-connected after the linkage gear (1), linkage shafts (10 and 11) can be alternately coupled to the switching gear (4). To create a variable switching logic and to save structural components of the switching gear (4), a superposition gear (3) is series-connected after the linkage gear (1) whose input shaft (14) can be coupled alternately to linkage shafts (10 and 11). Superposition gear (3), in which the main drive shaft rpm can be superposed on the rpm of the input shaft (14), in turn includes a linkage shaft (21) that can be coupled directly to a main output shaft (24) or to the switching gear (4).

4 Claims, 8 Drawing Sheets

| ✳ | 13 | 12 | 23 | 37 | 31 | 33 |
|---|---|---|---|---|---|---|
| R2 |  | ⊘ |  |  |  | ⊘ |
| R1 | ⊘ |  |  |  |  | ⊘ |
| 0 |  |  |  |  | ⊘ | ⊘ |
| V1A | ⊘ |  |  |  | ⊘ |  |
| V2 |  | ⊘ |  |  | ⊘ |  |
| V3 |  | ⊘ | ⊘ |  |  |  |
| V4L | ⊘ |  |  |  |  |  |
| V4S |  |  |  | ⊘ |  |  |
| V1B | ⊘ | ⊘ |  | ⊘ |  |  |

✳ SHIFTING COMPONENTS AND SPEEDS

| * | 13 | 12 | 23 | 31 | 33 |
|---|---|---|---|---|---|
| R2 |  | ⊘ |  |  | ⊘ |
| R1 | ⊘ |  |  |  | ⊘ |
| 0 |  |  |  | ⊘ | ⊘ |
| V1A | ⊘ |  |  | ⊘ |  |
| V2 |  | ⊘ |  | ⊘ |  |
| V3 |  | ⊘ | ⊘ |  |  |
| V4L | ⊘ |  | ⊘ |  |  |

* SHIFTING COMPONENTS AND SPEEDS

| * | 13 | 12 | 38 | 31 | 39 |
|---|---|---|---|---|---|
| R2 |  | ⊘ |  |  | ⊘ |
| R1 | ⊘ |  |  |  | ⊘ |
| 0 |  |  |  | ⊘ | ⊘ |
| V1A | ⊘ |  |  | ⊘ |  |
| V2 |  | ⊘ |  | ⊘ |  |
| V3 |  | ⊘ | ⊘ |  |  |
| V4L | ⊘ |  | ⊘ |  |  |

* SHIFTING COMPONENTS AND SPEEDS

FIG. 8

| * | 13 | 12 | 52 | 48 | 40 | 45 | 23 |
|---|---|---|---|---|---|---|---|
| R1 | ⊘ |  | ⊘ | ⊘ |  |  |  |
| 0 |  |  | ⊘ | ⊘ | ⊘ |  |  |
| V21 | ⊘ |  | ⊘ | ⊘ |  |  |  |
| V41 | ⊘ |  | ⊘ |  | ⊘ |  |  |
| V61 | ⊘ |  |  | ⊘ | ⊘ |  |  |
| V2 |  | ⊘ | ⊘ | ⊘ |  |  |  |
| V3 |  | ⊘ | ⊘ |  |  | ⊘ |  |
| V4 |  | ⊘ | ⊘ |  | ⊘ |  |  |
| V4L | ⊘ |  | ⊘ |  |  | ⊘ |  |
| V5 |  | ⊘ |  |  | ○ |  | ⊘ |
| V6 |  | ⊘ |  | ⊘ | ⊘ |  |  |
| V6L | ⊘ |  |  |  | ○ |  | ⊘ |

\* SHIFTING COMPONENTS AND SPEEDS

| * | 13 | 12 | 56 | 59 | 57 |
|---|---|---|---|---|---|
| R2 | | | | | ⊘ |
| R1 | ⊘ | | | | ⊘ |
| 0 | | | | ⊘ | ⊘ |
| V1A | ⊘ | | | ⊘ | |
| V2 | | ⊘ | | ⊘ | |
| V3 | | ⊘ | ⊘ | | |
| V4L | ⊘ | | ⊘ | | |

* SHIFTING COMPONENTS AND SPEEDS

| ✸ | 13 | 12 | 56 | 59 | 82 |
|---|---|---|---|---|---|
| R2 |  | ⊘ |  |  | ⊘ |
| R1 | ⊘ |  |  |  | ⊘ |
|  |  |  |  |  |  |
| V1 | ⊘ |  |  | ⊘ |  |
| V2 |  | ⊘ |  | ⊘ |  |
| V3 |  | ⊘ | ⊘ |  |  |
| V4 | ⊘ |  | ⊘ |  |  |

✸ SHIFTING COMPONENTS AND SPEEDS

FIG. 16

CIRCUIT CHANGE-OVER GEAR WITH INFINITELY VARIABLE TRANSMISSION

BACKGROUND OF THE INVENTION

This invention relates to a load change-over gear with infinitely variable transmission that includes a power distributing linkage gear and a control gear, preferably made in the form of a hydrostatic unit. The linkage gear comprises planetary gear sets and two linkage shafts on the power take-off side whose rpm's at a control-range boundary of the control gear are equal. In case of an adjustment of the control gear in the direction of control-range boundary, the rpm of one linkage gear will increase steadily and the rpm of the other linkage gear will decrease steadily, allowing the linkage gears to be alternately coupled to the control gear. The linkage gears can be alternately connected via clutches with an input shaft of a superposition gear in which it is possible to superpose on the input shaft rpm an rpm that is in a ratio to the main drive shaft rpm which can be altered constantly or gradually and where a linkage gear of the superposition gear can be coupled directly to the output shaft of the circuit change-over gear.

BRIEF DESCRIPTION OF THE PRIOR ART

A change-over gear of the kind mentioned above is known from U.S. Pat. No. 4,232,568 as shown in FIG. 5 thereof. Two coaxial linkage shafts of the linkage gear—constructed as a four-shaft planetary gear—whose transmission to the main drive shaft can be adjusted in an infinitely variable manner, are connected within the entire operating range of the load change-over gear either alternately with an input member such as a sun wheel or directly with an output shaft of the load change-over gear. A main drive shaft here drives a carrier of the superposition gear while a power output linkage gear of the superposition gear is connected with an internal ring gear of the superposition gear.

The linkage gear includes two planetary gear sets whose sun wheels in each case can be driven by the control gear, while the rpm of the main drive shaft acts upon an internal ring gear of the first planetary gear set and a carrier of the second planetary gear set. A first linkage shaft of the linkage gear is connected with the carrier of the first planetary gear set and a second linkage gear immediately thereafter adjoins the internal ring gear of the second planetary gear set.

This prior structure of the linkage gear is relatively complicated and leads to relatively large structural dimensions of the load change-over gear. Besides there are unfavorable control output influences because the entire speed range of the circuit change-over gear is covered by four control ranges.

The present invention was developed to create a compact structural arrangement of a load change-over gear where one can provide a structurally favorable arrangement of the linkage gear and where the entire speed range of the circuit change-over gear is subdivided into several control ranges of the linkage gear.

SUMMARY OF THE INVENTION

According to the invention, the linkage gear includes a double-planetary stage from which, in each case, a planetary wheel is operationally connected via a sun wheel with an output shaft of the control gear and via a hollow wheel or internal ring gear with the first linkage gear. The other planetary wheel of the double planetary stage engages a second sun wheel of the second linkage shaft. The common carrier of the double planetary stage is driven by the main drive shaft. Thus, a four-shaft linkage gear is provided with only one carrier and, in case of a compact design of the linkage gear, one can achieve rpm's on the linkage shafts which, in the control gear, lead to load-free speed change without traction force interruption. The input shaft is extended beyond the superposition gear, whereby—via this extension of the input shaft—at least one planetary wheel stage of a control gear can be driven.

According to an alternate embodiment, the problem is solved by including a double planetary stage for which one set of planetary wheels can be operationally connected via an internal ring gear with the first linkage shaft and via a sun wheel with the second linkage shaft, while the other set of planetary wheels of the double planetary stage is driven by a sun wheel connected with the output shaft of the control gear and a carrier is driven by the main drive shaft. The input shaft is extended beyond the superposition gear whereby, via this extension of the input shaft, at least one planetary wheel stage of a control gear can be driven.

According to another embodiment, the problem is solved by providing the linkage gear with two planetary gear stages, whereby one sun wheel of the first planetary gear stage as well as an outer central wheel of the second planetary gear stage are connected with the output shaft of the adjusting gear and an internal ring gear of the first planetary wheel stage and an inner central wheel of the second planetary wheel stage is connected with the first linkage shaft in gear-driven fashion. One carrier of the first planetary gear stage is driven by the main drive shaft and a planetary wheel carrier of the second planetary wheel stage is in contact with the second linkage gear. The input shaft is extended beyond the superposition gear whereby at least one planetary gear stage of a control gear can be driven via the extension of the input shaft. Such a linkage gear has a very compact structure.

It is possible to design the superposition gear as a reduced planetary gear stage, whereby planetary wheels of the first stage in each case engage a sun wheel of the input shaft and planetary wheels of the second stage mesh with a central wheel that can be coupled to the main drive shaft by means of a clutch. A carrier of the reduced planetary gear stage serves as the linkage shaft.

According to a further embodiment, the reduced planetary wheel stage includes double planets and the central wheel comprises a sun wheel. The reduced planetary wheel stage may be expanded by one set of planetary wheels that meshes with the double planets and an additional outer central wheel that can be fixed in position by means of a brake. When the brake is activated, transmission of the reverse speeds are higher for driving in reverse.

According to another embodiment, double planets are provided in the reduced planetary wheel stage to form the reduced planetary wheel stage, as a whole, from mutually meshing planets, whereby the central wheel is an internal ring gear.

Furthermore, the reduced planetary wheel stage of the superposition gear can be used for the adjustment of speed steps of the control gear. For this purpose, an internal ring gear of the first stage can be braked in a fixed position and the sun wheel of the second stage can be coupled to the main drive shaft or can be braked in a fixed position by means of a brake.

When the reduced planetary wheel stage is designed as mutually meshing planets, the planetary wheels of the first stage of the reduced planetary wheel stage can engage an outer central wheel that can be braked by means of a brake, as a result of which the reduced planetary wheel stage can be used for the creation of two additional speed steps of the circuit change-over gear, specifically, in case of corresponding activation of the double clutch of the linkage gear.

As a further embodiment of the invention, the load change-over gear includes a third planetary wheel stage which includes a sun wheel that is connected with the input shaft which is extended beyond the superposition gear and whose carrier can be connected via a clutch with the linkage shaft of the superposition gear or whose internal ring gear can be braked in a fixed manner via a brake.

Expanding the change-over gear provides a fourth planetary gear stage whose sun wheel is connected with the main drive shaft, and whose internal ring gear can be braked in a fixed manner via a brake. This fourth planetary wheel stage is used to adjust the reverse speed steps of the load change-over gear.

Moreover, it is possible to implement yet another change-over step using a clutch arranged between the extended input shaft and the main drive shaft. It is possible to connect a direct through-drive from the input shaft to the main drive shaft via this clutch.

A superposition gear, made as a simple planetary wheel stage can also be used as a revolving wheel stage of the change-over gear by means of the selected activation of a clutch arranged between the carrier and the main drive shaft or a brake acting upon the carrier. This results in a considerable reduction of the structural expenditure for the control gear.

The change-over gear includes two coupled planetary wheel stages, whereby one carrier shaft of the first planetary wheel stage can be coupled to the linkage shaft of the superposition gear or to the input shaft and receives a sun wheel of the second planetary wheel stage. One shaft of the second planetary wheel stage can be coupled to an outer central wheel of the first planetary wheel stage and is connected directly with the main drive shaft. Planetary wheels of the first planetary wheel stage mesh with a sun wheel attached to the input shaft. An internal ring gear of the second planetary wheel stage can be braked. A change-over gear designed in this fashion, by virtue of the switching combinations of its four switching elements, offers an extremely variable switching control logic for the load change-over gear according to the invention.

Finally, a group gear is connected in series after the change-over gear and this group gear increases the switching possibilities of the load change-over gear.

BRIEF DESCRIPTION OF THE FIGURES

Other objects and advantages of the invention will become apparent from a study of the following specification when viewed in the light of the accompanying drawings, in which.

DETAILED DESCRIPTION

FIGS. 1, 4, 6, 8, 10, 11, and 13 in each case illustrate a load change-over gear with infinitely variable transmission that includes a linkage gear 1, a control gear 2 made as hydrostatic unit, a superposition gear 3, and a change-over gear 4. Here, both the linkage gear 1 and the control gear 2 are driven by a main drive shaft 5 that is connected with the output side of a combustion engine (not shown). Main drive shaft 5, via different tooth wheel pairs, in a power-distributed manner, drives a carrier 6 of the linkage gear 1 and a hydrostatic primary unit—such as adjusting pump 7—of the control gear 2. Adjusting pump 7 constitutes a hydraulic circuit with a hydromotor 8 whose absorption volume is constant so that the transmission of control gear 2 in the control range boundaries of adjusting pump 7 can be set in an infinitely variable manner from −1 to +1. Linkage gear 1 includes a double planetary stage 9 on which linkage shafts 10 and 11 are arranged on the power takeoff or output side. These linkage shafts are coupled via clutches 12 and 13 to an input shaft 14 of the superposition gear 3. The double planetary stage 9 includes a first set of planetary wheels 9A and a second set of planetary wheels 9B.

Figure 1:
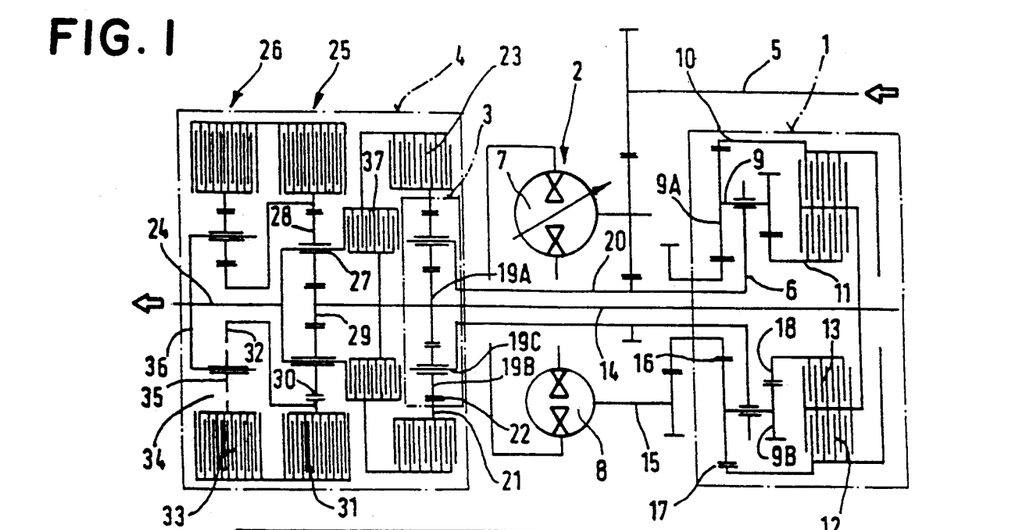
FIG. 1 is a schematic illustration of a load change-over gear with a linkage gear connected a hydrostatic control gear, and a unit, comprising a superposition gear and a change-over gear, connected in series after the linkage gear.

In the embodiment of FIG. 1, planetary wheel 9A is driven by an output shaft 15 of the control gear 2 via a sun wheel 16. An outer internal ring gear 17 is connected directly with the first linkage shaft 10. The second linkage shaft 11 engages an inner central wheel 18 that mates with the second planetary wheel set 9B of the double planetary stage 9. Via clutches 12 and 13, linkage shafts 10 and 11 can be coupled, as desired, to the input shaft 14 of the superposition gear 3. Input shaft 14 receives a sun wheel 19A in the superposition gear and is furthermore extended so that it will reach beyond the superposition gear all the way through the change-over gear 4. Planetary wheels 19B of the planetary stage of the superposition gear 3 are driven on their carrier 19C by an intermediate shaft 20 that is operationally connected with the main drive shaft 5.

At a linkage shaft 21 of the superposition gear 3, via an outer central wheel 22, there takes place a superposition of the power output branches from the input shaft 14 and the intermediate shaft 20. Here, linkage shaft 21 can be coupled via clutch 23 directly to a main output shaft 24 of the load change-over gear. Other speed steps can be set directly around the superposition gear 3 via two additional planetary gear stages 25 and 26 of the change-over or switching gear 4. From the first planetary wheel stage 25, a carrier 27 which establishes a connection between the linkage shaft 21 and the main output shaft 24 is provided with planetary wheels 28 that mate with a sun wheel 29 arranged on the input shaft in a nonrotating manner and an internal ring gear 30. Internal ring gear 30 can be maintained in a fixed position using brake 31, and furthermore is connected with a sun wheel 32 of the fourth planetary wheel stage 26. This planetary wheel stage 26 serves as a reversing step for setting two reverse speeds of the load change-over gear. For this purpose, planetary wheel stage 26 has a brake 33 which can maintain internal ring gear 34 in a fixed position. Thus, there is a power takeoff via a planetary carrier 36 receiving planetary wheels 35 going to the main output shaft 24. Furthermore, in the practical example according to FIG. 1, the extension of the input shaft 14 can be connected with the main output shaft 24 by means of a clutch 37.

Figure 2:
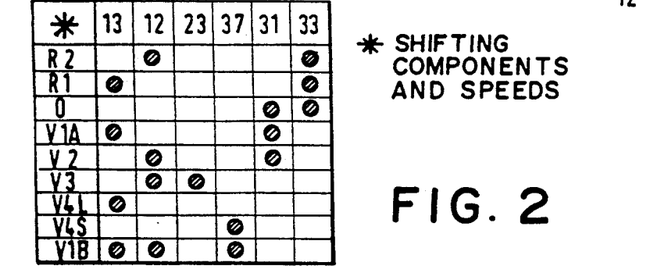
FIG. 2 is a switching control logic diagram for the gear according to FIG. 1.
Figure 3:
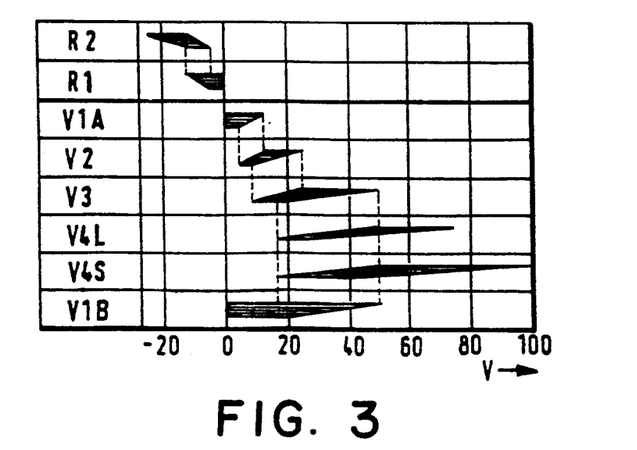
FIG. 3 is a standardized speed plan for a vehicle with the load change-over gear according to FIG. 1.

FIG. 2 illustrates the switching logic for the gear according to FIG. 1. By alternately activating the two clutches 13 and 12 of the linkage gear and by activating clutch 23 of the superposition gear 4, different speed ranges of the load change-over gear are set. An infinitely variable transition from one speed range to the next is provided as a result of the rpm ratios at linkage shafts 10 and 11. At a control range boundary of control gear 2, both linkage shafts have the same rpm, while, at the opposite control range boundary, one linkage shaft 10 becomes steadily faster and the other linkage shaft 11 becomes steadily slower. The load change-over gear according to FIG. 1 supplies two starting speeds VIA and VIB. The starting speed VIA—as is indicated in the standardized speed plan according to FIG. 3—includes only a small speed range for start-up in case of great traction force requirement. On the other hand, in start-up speed VIB—in which the main output shaft 24 is driven directly by the linkage shaft 11—about 50% of the total speed range of the load change-over gear is covered. This start-up speed VIB is suitable for starting under conditions requiring minor traction force. From the start-up speed VIB, one can switch to the fastest speed range V4S. Speed step V4L—during which a second power distribution is connected on the superposition gear 3—covers the main driving range whereby the output share that flows via the infinitely variable control gear 2 is particularly small. This results in a particularly good gear efficiency in this speed step. On the basis of the variable switching logic, the load change-over gear according to the invention offers the possibility of a very comfortable style of driving, whereby the following switching procedures can be implemented for the vehicle's forward drive:

VIA-V2-V3-V4S;  VIA-V2-V3-V4L;  VIB-V4S; VIB-V4L

Figure 4:
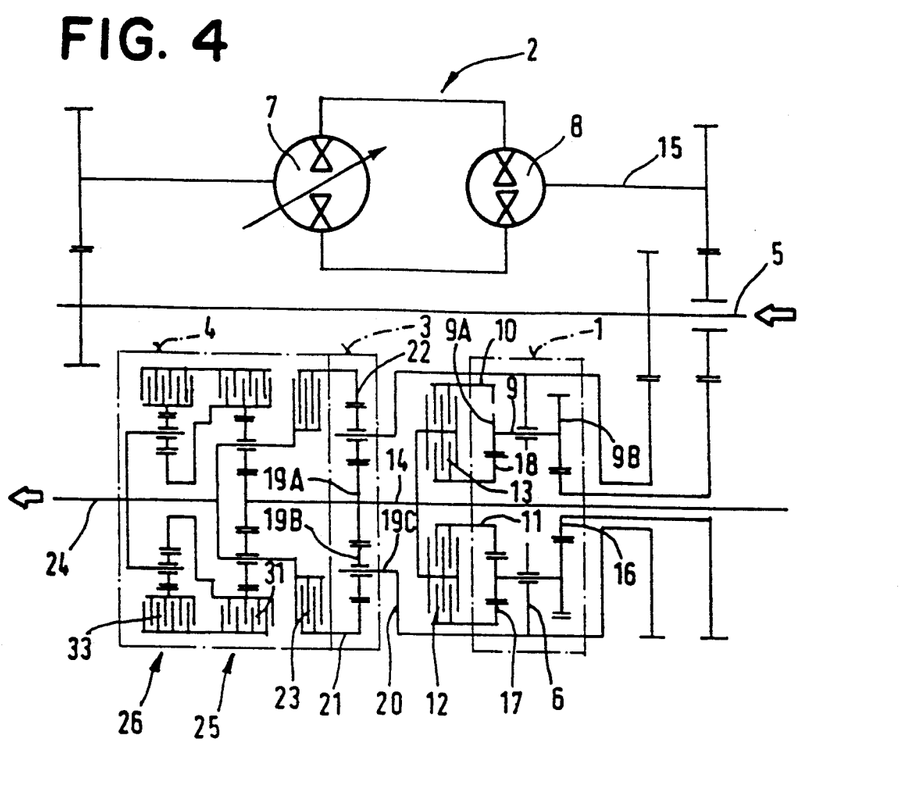
FIG. 4 shows a load change-over gear with an altered arrangement of the control gear as well as an altered design of the linkage gear and the change-over gear.
Figure 5:
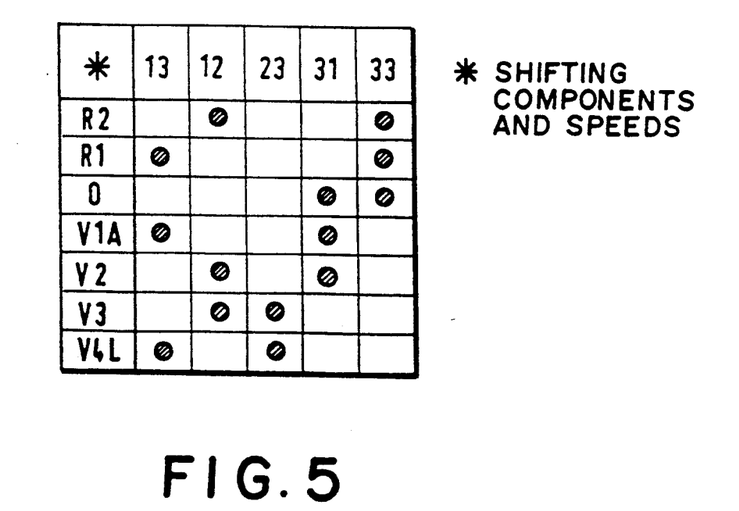
FIG. 5 is a switching logic diagram for the load change-over gear according to FIG. 4.

The practical design example of the invention according to FIG. 4 differs from the structure of the change-over gear according to FIG. 1 by virtue of the fact that in linkage gear 1, the planetary wheel 9B of the double planetary stage 9 is driven by the sun wheel 16 of the output shaft 15 of the control gear 2, whereas on the other planetary wheel 9A, the linkage shaft 10 is attached via outer internal ring gear 17 and linkage shaft 11 is attached via sun wheel 16. This possibility of designing the linkage gear 1 results from the fact that carrier 6 is driven from the outside. Because this load change-over gear is not provided with a clutch between the extension of input shaft 14 and the main output shaft 24, as is the case in FIG. 1 with clutch 37, no start-up speed with great speed range can be set in this load change-over gear. But as indicated in the switching logic according to FIG. 5, clutch 23 of superposition gear 3 is so set in speed steps V3 and V4L that a power output will result on the main output shaft 24 from a superposition of the output from the main drive shaft 5 and input shaft 14. In this way, the output shaft rotation via the infinitely variable control gear 2 is very small also in this circuit arrangement. The two speed steps V3 and V4L in this case likewise cover the main speed range of the vehicle.

Figure 6:
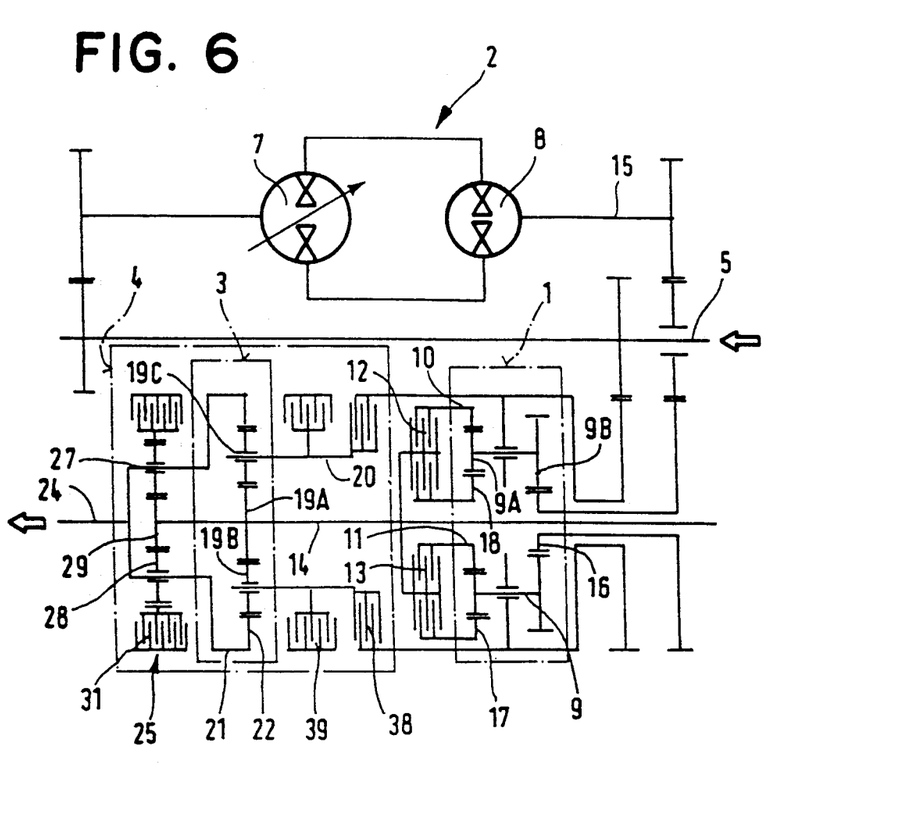
FIG. 6 shows a load change-over gear where a superposition gear, made as a simple planetary wheel stage, is connected as a revolving wheel stage of the change-over gears.
Figure 7:
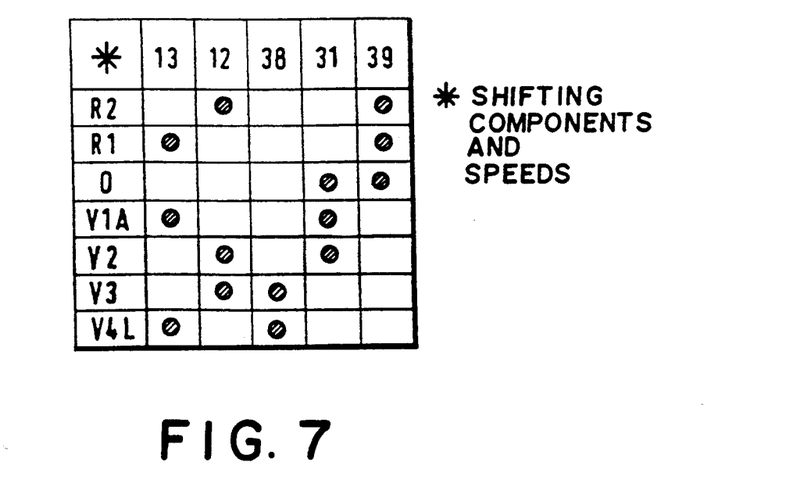
FIG. 7 is a switching logic diagram for the load change-over gear according to FIG. 6.

In the load change-over gear according to FIG. 6 (whose switching logic is illustrated in FIG. 7) the linkage gear has the same design as shown in FIG. 4. The intermediate shaft 20 driven by the main drive shaft 5 is coupled by means of a clutch 38 to carrier 19C of the superposition gear 3 or the carrier can be braked by means of a brake 39. In this manner, gear elements of the superposition gear 3 are also used for the change-over or switching gear 4 because the wheel set of the superposition gear serves as a reversing device, when brake 39 is activated. By activating clutches 12 and 13 of linkage gear 1, the reverse gear speeds R1 and R2 can be set. The other planetary stage 25 of the switching gear 4 connected in series after the superposition gear 3 agrees in design and operation with the planetary wheel stage 25 of FIGS. 1 and 4.

Figure 8:
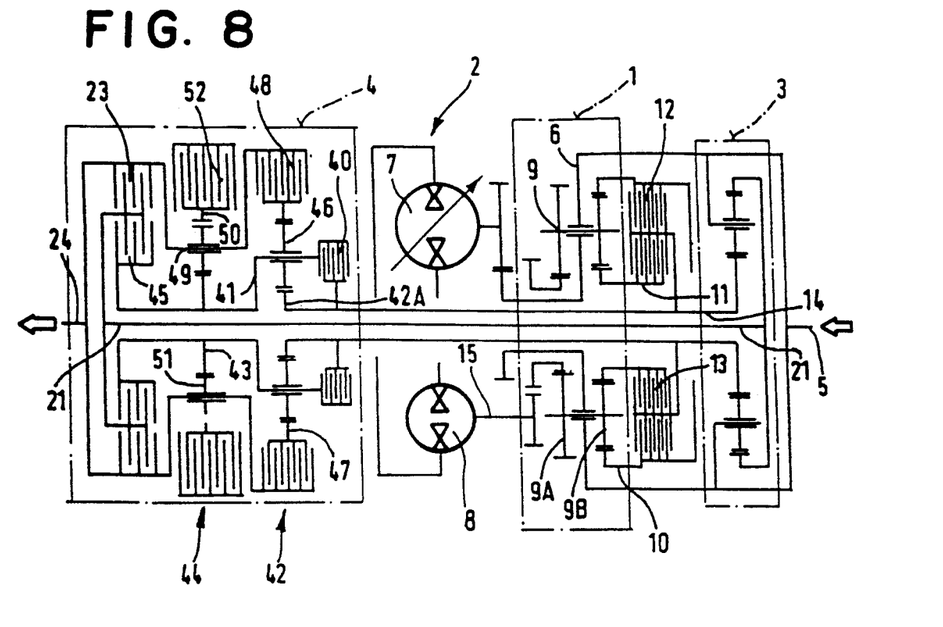
FIG. 8 shows another version of a load change-over gear where, by using additional control clutches, an increased number of speeds can be set in the control gear.
Figure 9:
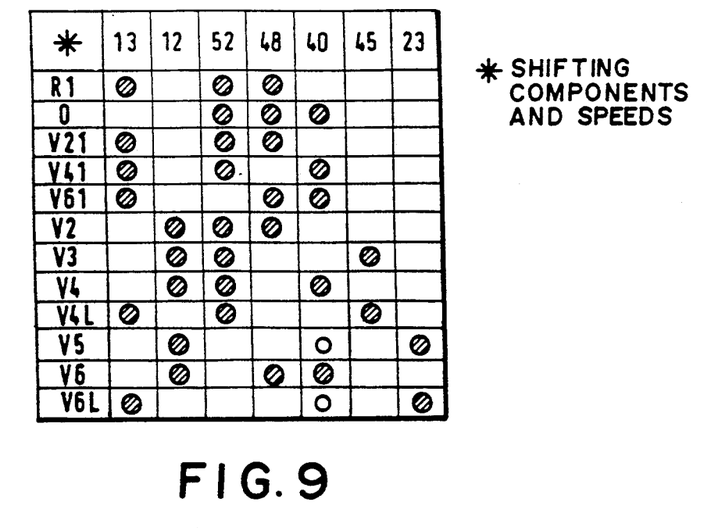
FIG. 9 is a switching logic diagram for the gear according to FIG. 8.

In the load change-over gear of FIG. 8, whose switching logic is given in FIG. 9, the superposition gear 3 and the change-over switching gear 4 are separated from each other in terms of space. Input shaft 14, which is a hollow shaft, of superposition gear 3 is run out of the linkage gear 1 on both sides and inside receives linkage shaft 21 of the superposition gear 3. The linkage shaft can be connected via clutch 23 directly with the main output shaft 24. Furthermore, input shaft 14 can be connected via a clutch 40 with a rod shaft 41 of a first planetary stage 42, whereby the rod shaft 41 furthermore receives a sun wheel 43 of a second planetary stage 44 and finally can be coupled to the linkage shaft 21 via a clutch 45,. Planetary wheels 46 of the first planetary stage 42 engage a sun wheel 42A and an outer central wheel 47 that can be connected via a clutch 48 with a rod shaft 49 of the second planetary stage 44, whereby this rod shaft 49 is connected directly with the main output shaft 24. An internal ring gear 50, that engages planetary wheels 51 of the second planetary stage 44, can be braked in a fixed manner by means of a brake 52.

The change-over gear in FIG. 8 supplies three step speeds for forward drive: the biggest transmission during drive on sun wheel 42A of the first planetary stage 4 and activation of clutch 48 and brake 52 of the middle speed step in case of drive via clutches 40 or 45, sun wheel 43 of the secondary planetary stage 44 with brake 52 closed; and direct through-drive in case of direct bridging of changeover gear 4, in that clutch 23 engages and consequently linkage shaft 21 is connected with the main output shaft 24. The direct bridging of the change-over gear 4 is also achieved by engaging clutches 40 and 48 so that the input shaft 14 will be connected directly with the main output shaft 24.

The switching logic for the load change-over gear according to FIG. 8 makes it clear that a variable switching logic is present. The following switching processes can be implemented for forward drive:
V21-V2-V3-V4-V5-V6; V21-V2-V3-V4-V5-V6L; V21-V2-V3-V4L; V41-V4-V5-V6; V41-V4-V5-V61; V41-V4L; V51-V6; V51-V6L.

In terms of simple control procedures, clutch 40 remains closed during forward speeds V5 and V6L, but it does not transmit any torque.

Figure 10:
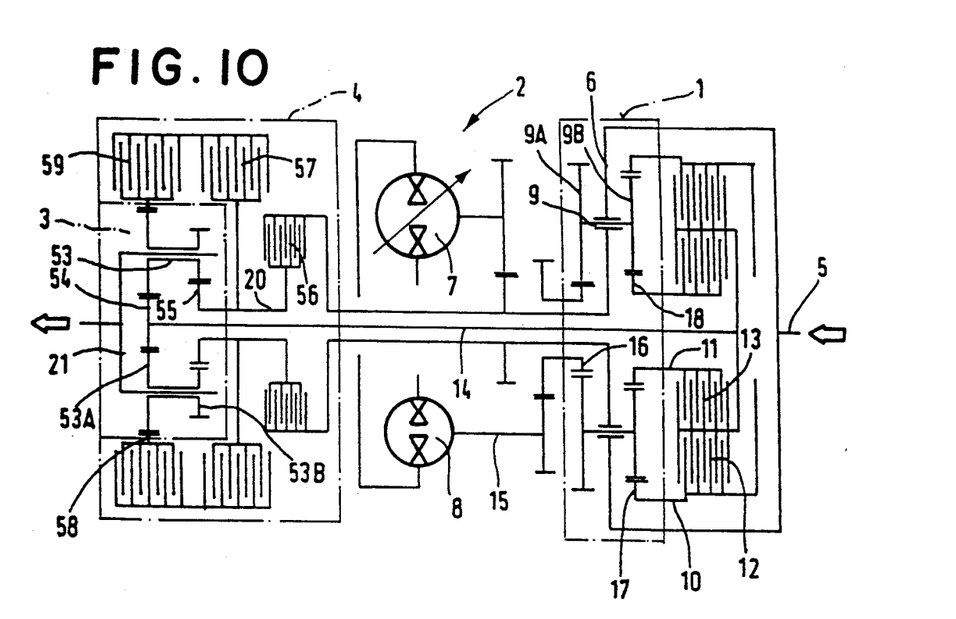
FIG. 10 shows a version of a load change-over gear whose superposition gear includes a reduced planetary stage that can likewise be connected as a rotary wheel stage of a change-over gear.
Figure 11:
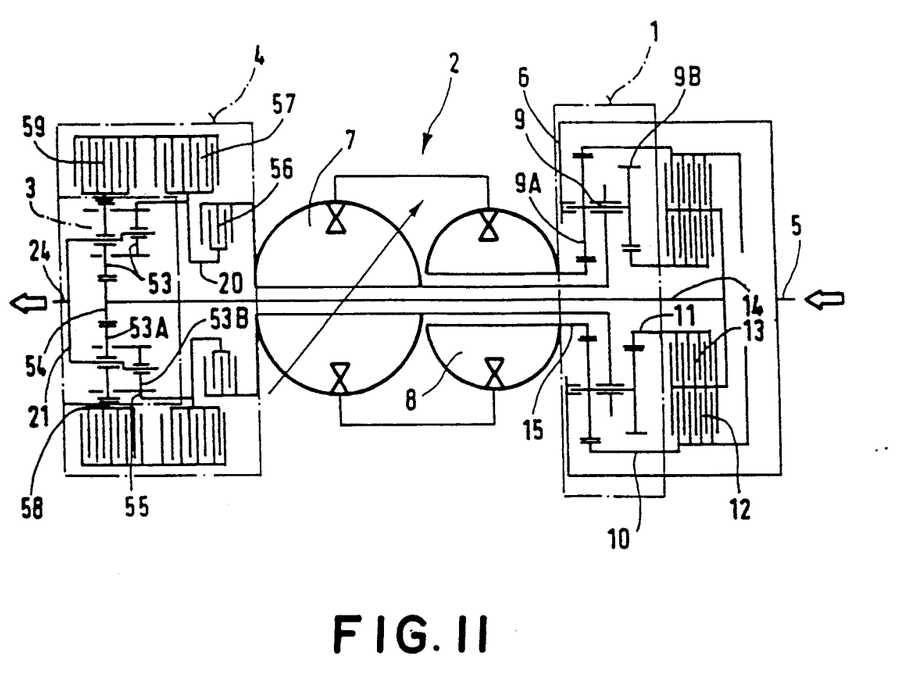
FIG. 11 shows a design of the reduced planetary stage altered with respect to FIG. 10.
Figure 12:
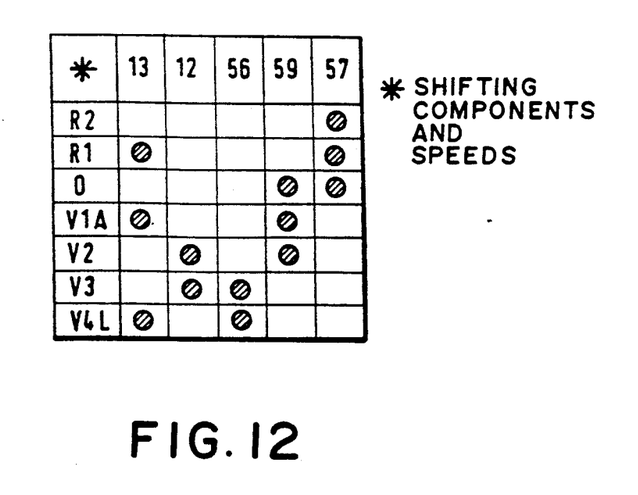
FIG. 12 is a switching logic diagram for the load change-over gear according to FIGS. 10 and 11.

In the embodiment of FIGS. 10 and 11, whose switching logic is shown in FIG. 12, the superposition gear 3 has a reduced planetary wheel stage 53, whereby planetary wheels 53A of one step engage a central wheel 54 attached on input shaft 14, while planetary wheels 53B of the second stage mate with a central wheel 55 arranged on intermediate shaft 20. Intermediate shaft 20 can be coupled to main drive shaft 5 via a clutch 56 or it can be fixed in position by a brake 57. The carrier of the reduced planetary wheel stage 53 serves as linkage shaft 21. Planetary wheels 53A of the first stage engage an outer central wheel 58 that can be fixed in position via a brake 59. The two practical examples of FIGS. 10 and 11 differ in that in FIG. 10, the two planetary wheels 53A and 53B form double planetary wheels, whereas in FIG. 11, they mate with each other. Therefore, central wheel 55, according to FIG. 10, must be a sun wheel and, according to FIG. 11, it must be another internal ring gear.

In this load change-over gear, two reverse speed steps are set in case of activation of brake 57 and alternate coupling of linkage shafts 10 and 11 to input shaft 14, whereas in the two lower forward steps, brake 59 and, in the upper speed steps, clutch 56 will be connected to set the power output summation in the superposition gear 3. A load change-over gear with this structure offers the essential advantage that the structural components of the superposition gear 3 at the same time assume functions of the change-over gear 4.

Figure 13:
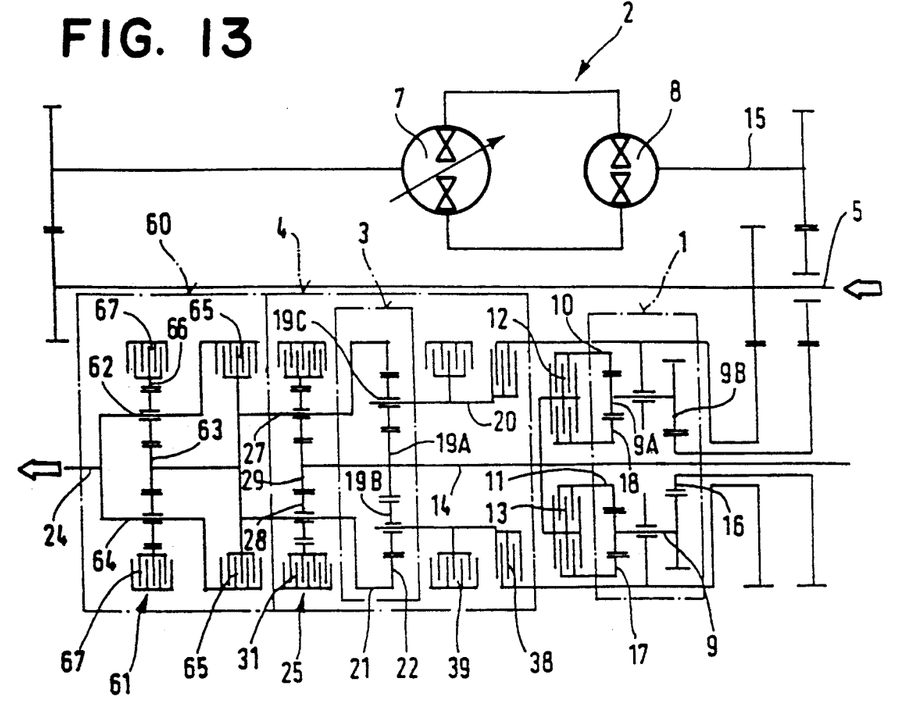
FIG. 13 shows a load change-over gear according to FIG. 6, to which a group gear is connected in series.
Figure 14:
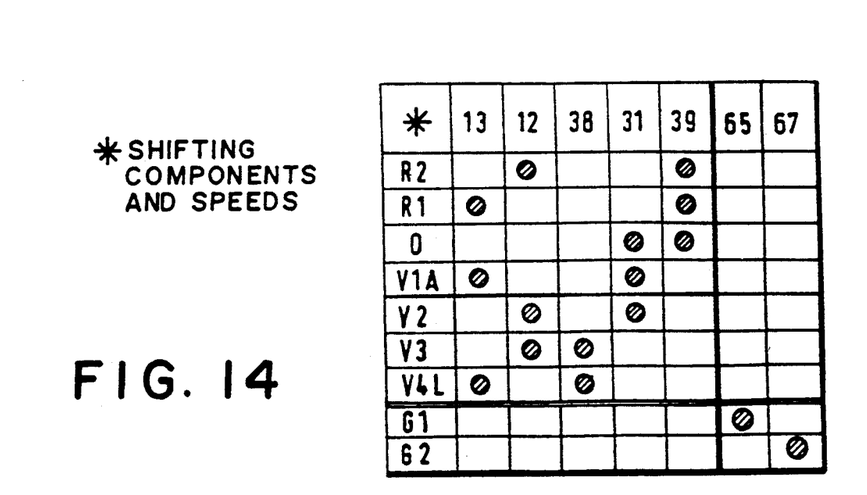
FIG. 14 is a switching logic diagram for the load change-over gear according to FIG. 13.

The practical example in FIG. 13, whose switching logic is shown in FIG. 14, basically has the same structure as the load change-over gear according to FIG. 6. The only difference is that a group gear 60 is connected in series after change-over gear 4. Carrier 27 is not directly connected with the main output shaft 24; instead, it leads to a planetary stage 61 to drive the latter's planetary wheels 62 via a sun wheel 63. Main output shaft 24 is in contact with a rod shaft 64 of this planetary stage 61 and can, for the purpose of connecting a direct through-drive of the group gear, be coupled to carrier 27 by means of a clutch 65. For the rpm reduction of the main output shaft 24, an internal ring gear 66 of planetary stage 61 is fixed in position by means of a brake 67. It follows from the switching logic in FIG. 14 that it is possible to achieve a rapid change of the transmission of the load change-over gear within the individual speed steps by means of the group gear 60 which is series-connected after the change-over gear 4. This kind of arrangement is particularly suitable for prime movers such as agricultural or construction tractors where there are extreme fluctuations in the traction force requirement. In general group gear 60 can be series-connected after all of the change-over gears illustrated in the other FIGS. 1, 4, 8, 10, and 11.

The use of such a group gear 60 is also indicated when linkage gear 1 is designed with a simple planetary stage. During start-up, the load change-over gear then uses up only half of the control range of control gear 2. Considering the group connection possibility, very favorable layout data for the control gear is obtained.

Figure 15:
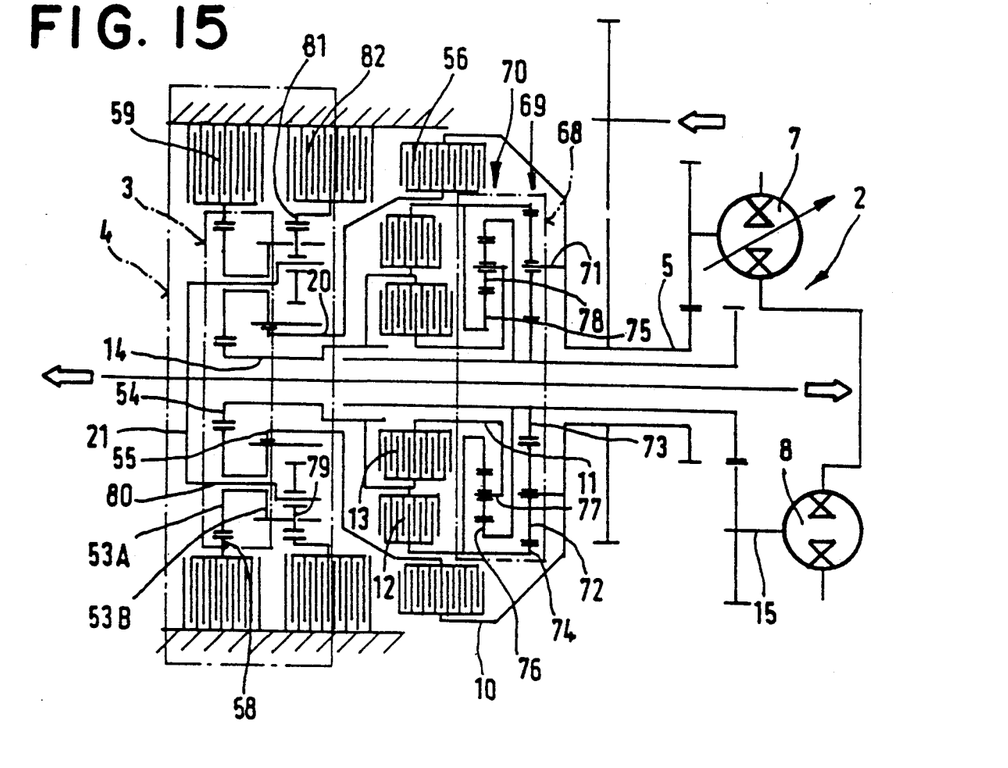
FIG. 15 shows a variant of the load change-over gear according to the invention where the linkage gear includes two planetary wheel stages and where a change-over gear includes another set of planetary wheels meshing with the double planets.

In the practical example according to FIG. 15, a linkage gear 68 driven by the main drive shaft 5 and the output shaft 15 of control gear 2 is provided with two planetary wheel stages 69 and 70. On a carrier 71 connected with the main drive shaft 5, planetary wheels 72 of the first planetary wheel stage 69 are arranged. They mate with a sun wheel 73, driven by the output shaft 15 of control gear 2, and an internal ring gear 74. This internal ring gear 74 of the first planetary wheel stage 69 is connected with an inner central wheel 75 of the second planetary wheel stage 70 and forms the first linkage shaft 10 which, in agreement with the above-mentioned practical examples, can be coupled via clutch 12 to input shaft 14 of the superposition gear 3. An outer central wheel 76 of this second planetary wheel stage 70 is likewise driven by the output shaft 15 of the control gear 2 while a planet carrier 77, on which planetary wheels 78 of this second planetary wheel stage 70 are arranged in a freely rotatable manner, serves as the second linkage shaft 11. that can be connected via clutch 13 with input shaft 14 of the superposition gear 3.

The structure of change-over gear 4 conforms with the structure shown in FIG. 10 except an additional planetary wheel set 79 mates with the planetary wheels 53B of the reduced planetary wheel stage 53. The planetary wheel set 79, together with planetary wheels 53A and 53B combined into the double planets, is arrange on a carrier 80. Planetary wheel 79 engages an internal ring gear 81 that can be fixed in position by means of a brake 82.

Figure 16:
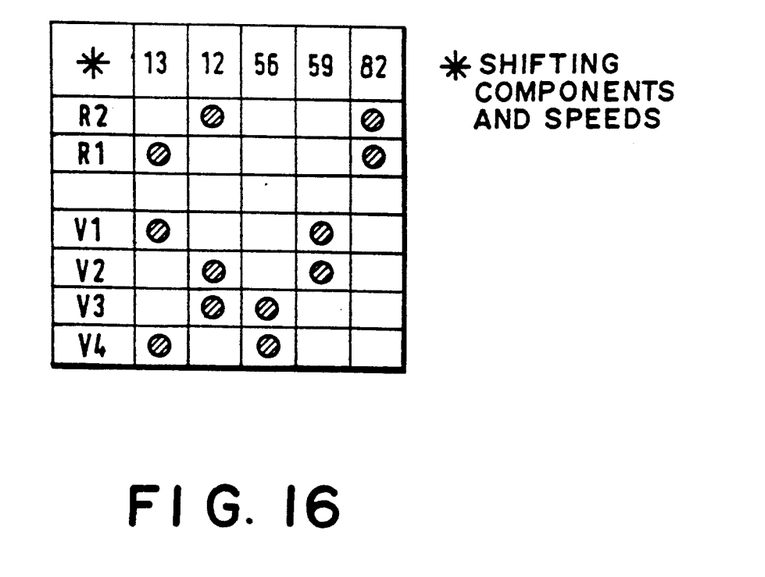
FIG. 16 is a switching logic diagram for the gear according to FIG. 15.

The switching logic illustrated in FIG. 16 for the load change-over gear according to FIG. 15 corresponds with the switching logic according to FIG. 12. In the reverse speed steps R1 and R1, the brake 82, which is connected with the internal ring gear 81 of the additional planetary wheel set 79, is activated. With this kind of combination of double planetary stage (planetary wheels 53A and 53B) and with these mating planetary wheels (planetary wheel set 79), one can achieve high transmission rates for the reverse drive of the vehicle. The variant of the linkage gear 68, illustrated in FIG. 15, with two planetary wheel stages 69 and 70 is characterized by a particularly compact design.

I claim:

1. An improved load change-over gear with infinitely variable transmission including a power-distributing linkage gear (1,) driven by a main drive shaft (5) from an engine and a hydrostatic control gear (2) controlling said linkage gear, said linkage gear (1) having two planetary wheel stages and a first and a second output linkage shaft (10,11) whose rpm's are identical at a first control range boundary of said control gear (2), the rpm of said second linkage shaft (11) increases steadily while the rpm of said first linkage shaft (10) decreases steadily when said control gear (2) is adjusted in the direction of a second control range boundary opposite said first control range boundary, said first and second linkage shafts (10 and 11) being alternately coupled to a change-over gear (4) and connected via clutches (12 and 13) with an input shaft (14) of a superposition gear (3) for superposing on the revolution of said input shaft (14) a revolution that is proportional to a revolution of said main drive shaft said superposition gear (3) including a third linkage shaft (21) coupled directly to a main power output shaft (24) of said load change-over gear, wherein the improvement comprises:

(a) said two planetary wheel stages includes a double planetary stage (9) having first planetary wheels (9A) optionally connected with an output shaft (15) of said control gear (2) via a first sun wheel (16) and with said first linkage shaft via a first internal gear (17), said second planetary wheels (9B) meshing with a second sun wheel (18) of said second linkage shaft;

(b) said double planetary stage includes a common carrier (6) driven by said main drive shaft;

(c) said input shaft (14) includes an extension beyond said superposition gear (3) which comprises a drive shaft of said change-over gear for driving at least one planetary wheel stage of said change-over gear via friction devices (31,33,37); and (d) said third linkage shaft (21) is coupled with said change-over gear (4).

2. A load change-over gear as defined in claim 1, said change-over gear (4) further comprising a third planetary wheel stage (25) including a third sun wheel (29) connected with the input shaft and a carrier (27) connected with said main power output shaft (24) for coupling to said linkage shaft (21) via a first clutch (23), said third planetary wheel stage further including a second internal gear (30) which is fixed in position by a first brake (31).

3. A load change-over gear as defined in claim 2, said change-over gear (4) further comprising a fourth planetary wheel stage (26) including a fourth sun wheel (32) connected with said second internal gear and a planetary carrier (36) connected with said main power output shaft and having a third internal gear (34) which is fixed in position by a second brake (33).

4. A load change-over gear as defined in claim 2, said change-over gear (4) further comprising a second clutch (27) for connecting said input shaft (14) with said main power output shaft (24).

* * * * *